(12) United States Patent
Hwang et al.

(10) Patent No.: US 7,987,153 B2
(45) Date of Patent: Jul. 26, 2011

(54) APPARATUS AND METHOD FOR AUTOMATICALLY MIGRATING USER'S WORKING DATA

(75) Inventors: Tae In Hwang, Daejeon (KR); Ho Jin Park, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1186 days.

(21) Appl. No.: 11/678,667

(22) Filed: Feb. 26, 2007

(65) Prior Publication Data

US 2008/0082547 A1    Apr. 3, 2008

(30) Foreign Application Priority Data

Sep. 29, 2006    (KR) .................. 10-2006-0096577

(51) Int. Cl.
*G06F 17/30* (2006.01)
(52) U.S. Cl. ....................................................... 707/610
(58) Field of Classification Search .................. 707/610
See application file for complete search history.

(56) References Cited

U.S. PATENT DOCUMENTS

| | | | | |
|---|---|---|---|---|
| 6,577,238 | B1 * | 6/2003 | Whitesmith et al. | 340/572.1 |
| 2002/0065919 | A1 * | 5/2002 | Taylor et al. | 709/226 |
| 2004/0044721 | A1 | 3/2004 | Song et al. | |
| 2004/0153973 | A1 | 8/2004 | Horwitz | |
| 2006/0244596 | A1 * | 11/2006 | Larson et al. | 340/572.1 |
| 2007/0143357 | A1 * | 6/2007 | Chaudhri | 707/201 |
| 2007/0290036 | A1 * | 12/2007 | Yang et al. | 235/382 |

FOREIGN PATENT DOCUMENTS

| | | |
|---|---|---|
| KR | 1020010000587 | 1/2001 |
| KR | 1020010068739 | 7/2001 |
| KR | 1020020012734 | 2/2002 |
| KR | 1020040086919 | 10/2004 |
| KR | 1020050029266 | 3/2005 |
| KR | 1020050077239 | 8/2005 |
| KR | 1020060025518 | 3/2006 |
| KR | 1020060073842 | 6/2006 |
| WO | WO2004/062260 | 7/2004 |

OTHER PUBLICATIONS

Johansen, Dag, et al., "Environment Mobility—Moving the Desktop Around", 2004, 2nd *Workshop on Middleware for Pervasive and Ad-Hoc Computing*.

* cited by examiner

*Primary Examiner* — James Trujillo
*Assistant Examiner* — William Spieler
(74) *Attorney, Agent, or Firm* — Ladas & Parry LLP

(57) ABSTRACT

An apparatus and method for automatically migrating user's working data by using automatic work data migration apparatuses connected respectively to work devices. In the method, the automatic work data migration apparatus detects that the user leaves or accesses the work device. User work data related to the work device are collected and the collected user work data stored in the automatic work data migration apparatus, if it is detected that the user leaves the work device. The storage location information of the user work data is provided to another automatic work data migration apparatuses connected to the automatic work data migration apparatus. The automatic work data migration apparatus searches the storage location information of the user work data if it is detected that the user accesses the work device. The automatic work data migration apparatus connected to the work device accessed by the user receives the user work data related to a work executed in the previous work device.

18 Claims, 4 Drawing Sheets

APPARATUS AND METHOD FOR AUTOMATICALLY MIGRATING USER'S WORKING DATA

CLAIM OF PRIORITY

This application claims the benefit of Korean Patent Application No. 2006-96577 filed on Sep. 29, 2006 in the Korean Intellectual Property Office, the disclosure of which is incorporated herein by reference.

BACKGROUND OF THE INVENTION

1. Field of the Invention

The present invention relates to an apparatus and method for automatically migrating user's working data, and more particularly, to an apparatus and method for automatically migrating user's working data, the use of which makes it easy to migrate user's working data from the previous work device previously accessed by the user to a target work device currently accessed by the user.

2. Description of the Related Art

In order for a user to continuously execute a predetermined work using work devices such as computers, PDAs and network terminals, files edited or executed by an application in the work device, environment setting information, and application environment setting information must be maintained during the execution of the predetermined work.

However, in work environments provided at places such as university campuses, companies, and public service centers, such setting information is stored only in the previous work device. Accordingly, in order to continue to execute the work of the previous work device in another work device, a user must personally store and transfer the setting information from the previous work device to a target work device using a portable storage device such as a USB memory.

In order to solve this problem, another method is proposed that backs up the setting information and the execution data in a personal storage space (e.g., Webhard) available on the Internet and recovers the setting information in a target work device. However, all of the tasks are manually performed by a user. Therefore, if the user migrates frequently, the tasks are too bothersome. Moreover, because the tasks are implemented in a server-client scheme, a load is concentrated on a central server, leading to a trouble in the central server. Furthermore, high-priced server devices must be used in the above method.

SUMMARY OF THE INVENTION

The present invention has been made to solve the foregoing problems of the prior art and therefore an aspect of the present invention is to provide an to an apparatus and method for automatically migrating user's working data, the use of which can make it easy to migrate user's working data from the previous work device previously accessed by the user to a target work device currently accessed by the user.

According to an aspect of the present invention, a method for automatically migrating user's working data by using a plurality of automatic work data migration apparatuses connected respectively to a plurality of work devices to be used by the user to make a work includes: a first step in which the automatic work data migration apparatus connected to the work device detects that the user leaves or accesses the work device; a second step of collecting user work data related to the work device and storing the collected user work data in the automatic work data migration apparatus connected to the work device, if it is detected that the user leaves the work device; a third step of providing the storage location information of the user work data to another automatic work data migration apparatuses connected to the automatic work data migration apparatus; a fourth step in which the automatic work data migration apparatus connected to the work device searches the storage location information of the user work data if it is detected that the user accesses the work device; and a fifth step in which the automatic work data migration apparatus connected to the work device accessed by the user in the fourth step receives the user work data related to a work executed in the previous work device.

According to another aspect of the present invention, an apparatus for automatically migrating user's working data includes: a user migration detector for detecting that that the user leaves or accesses an automatic work data migration apparatus connected to a virtual ring network; a user work data collecting/storing unit for collecting and storing the user work data if it is detected by the user migration detector that the user leaves the automatic work data migration apparatus; a user work data storage location notifier for recording, in another automatic work data migration apparatus, the storage location information of the user work data that is stored by the user work data collecting/storing unit; a user work data searcher for searching and detecting the location information of the automatic work data migration apparatus if the user accesses the automatic work data migration apparatus; and a user work data downloader for detecting the location information searched by the user work data searcher and transmitting the user work data stored in the automatic work data migration apparatus corresponding to the detected location information to the automatic work data migration apparatus accessed by the user.

According to an embodiment of the present invention, the apparatus further includes a distributed hash table manager for managing a distributed hash table for use of a distributed hash function so that the user work data storage location notifier and the user work data searcher is able to synchronize the distributed management of the user work data and the data search.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
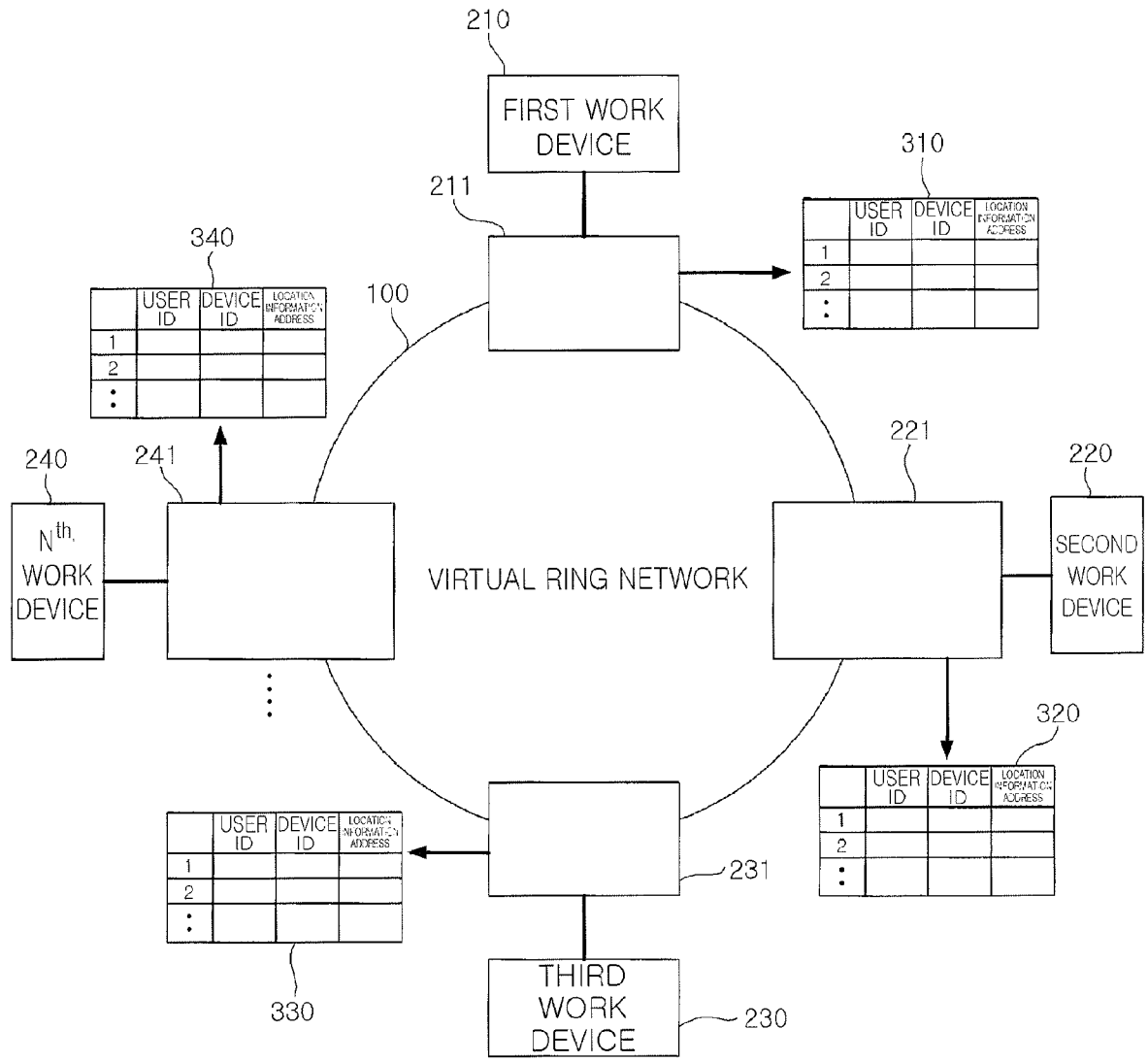
FIG. 1 illustrates the entire system structure in which an automatic work data migration apparatus operates in the entire virtual ring network according to an embodiment of the present invention.

Exemplary embodiments of the present invention will now be described in detail with reference to the accompanying drawings.

In the following description of the embodiments of the present invention, detailed descriptions about well-known functions and configurations incorporated herein will be omitted if they are deemed to obscure the subject matter of the present invention. In addition, like reference numerals in the drawings denote like elements.

FIG. 1 illustrates the entire system structure in which an automatic work data migration apparatus operates in the entire virtual ring network according to an embodiment of the present invention.

Referring to FIG. 1, the entire system includes N number of work devices 210, 220, 230 and 240, N number of automatic work data migration apparatuses 211, 221, 231 and 241, a logical virtual ring network 100, and N number of distributed hash tables 310, 320, 330 and 340. The work devices 210, 220, 230 and 240 are used for a user to make a work personally. The automatic work data migration apparatuses 211, 221, 231 and 241 are used to migrate user's working data automatically. The logical virtual ring network 100 is used to connect the automatic work data migration apparatuses 211, 221, 231 and 241 in a peer-to-peer (P2P) scheme. The distributed hash tables 310, 320, 330 and 340 are used to manage the automatic work data migration apparatuses 211, 221, 231 and 241, respectively.

Examples of the work devices 210, 220, 230 and 240 are computers, PDAS, and network terminals that have a built-in microprocessor capable of generating and processing binary data. In order to transmit/receive data, the work devices 210, 220, 230 and 240 may be connected to a separate wired/wireless network or may be connected through the automatic work data migration apparatus to an external network.

The user's working data are data related to a work that is made by the user using the work device connected to the virtual ring network. Examples of the user's working data are work document files, audio/video files, work device environment setting files, and work application environment setting data.

As illustrated in FIG. 1, the automatic work data migration apparatuses 211, 221, 231 and 241 are respectively configured to correspond to the work devices 210, 220, 230 and 240 and to include the distributed hash tables 310, 320, 330 and 340. Although FIG. 1 illustrates that the automatic work data migration apparatuses 211, 221, 231 and 241 are installed outside the work devices 210, 220, 230 and 240, the present invention is not limited to this. That is, the automatic work data migration apparatus may be built in the corresponding work device.

Figure 2:
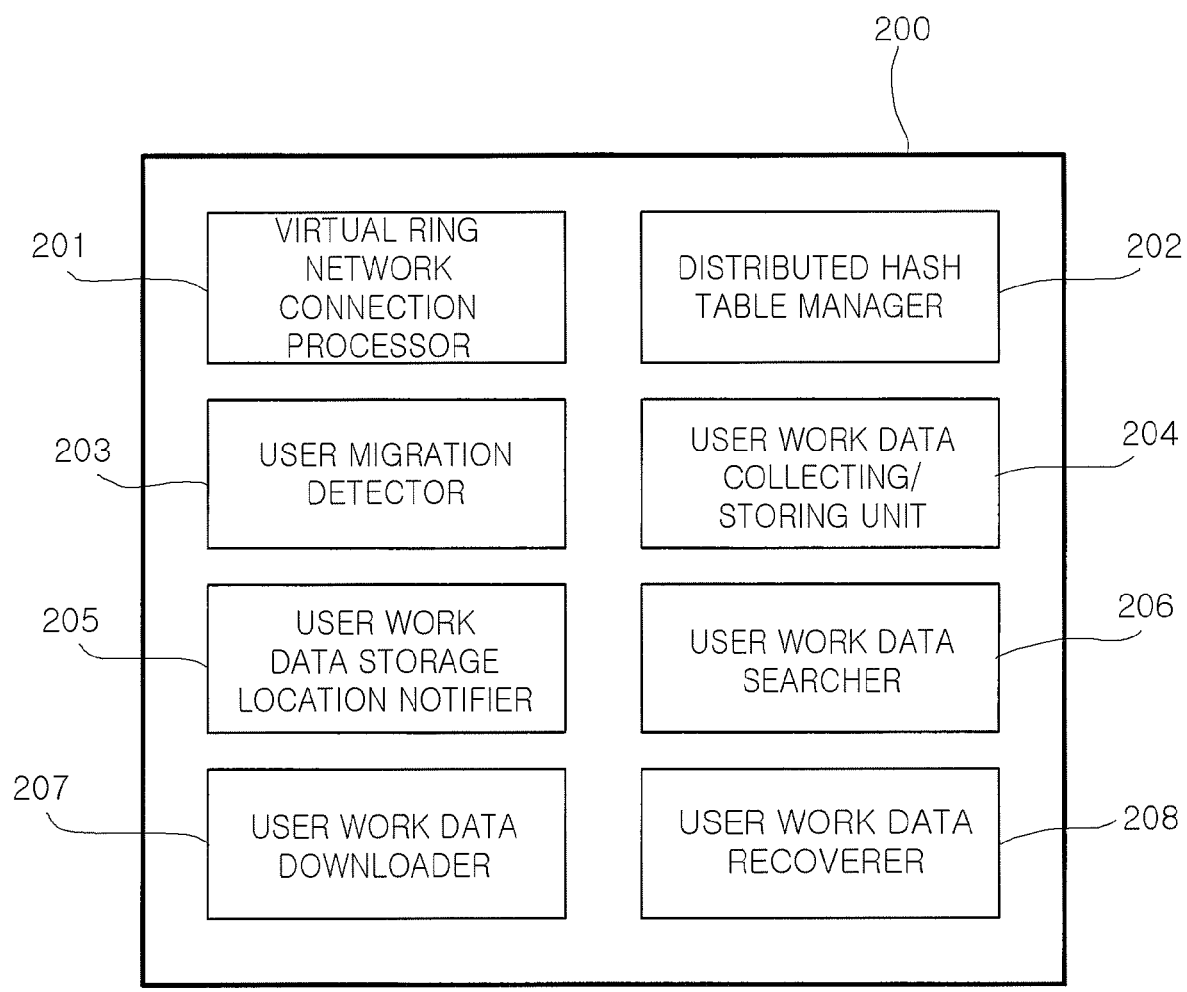
FIG. 2 is a block diagram of an automatic work data migration apparatus according to an embodiment of the present invention.

FIG. 2 is a block diagram of the automatic work data migration apparatus according to an embodiment of the present invention.

Referring to FIG. 2, an automatic work data migration apparatus includes a virtual ring network connection processor 201, a distributed hash table manager 202, a user migration detector 203, a user work data collecting/storing unit 204, a user work data storage location notifier 205, a user work data searcher 206, a user work data downloader 207, and a user work data recoverer 208.

The virtual ring network connection processor 201 connects the automatic work data migration apparatuses to the virtual ring network and maintains the connection. In detail, if the user makes a continuous work by migrating between the work devices connected to the automatic work data migration apparatuses, the virtual ring network connection processor 201 defines the relationship between a plurality of devices including the automatic work data migration apparatus connected to the work device previously accessed by the user before the migration and the automatic work data migration apparatus connected to the work device currently accessed by the user after the migration, and maintains the connection.

In order to establish the virtual ring network, the virtual ring network connection processor 201 assigns a separate identification number to each of the automatic work data migration apparatuses connected to the work devices accessed by the user. The identification number is used as an ID number of the automatic work data migration apparatus on the virtual ring network. Thereafter, the virtual ring network connection processor 201 arranges the automatic work data migration apparatuses in order of the assigned ID number, connects the automatic work data migration apparatuses with the ID numbers contiguous to each other, and connects the automatic work data migration apparatuses with the start and end ID numbers.

For distributed management of data and efficient search of data, the distributed hash table manager 202 generates a distributed hash table using a hash function and manages the distributed hash table. The hash table may be any hash table that outputs the same value in response to the same input and outputs different values in response to different inputs. It is preferable to use the same hash function in the automatic work data migration apparatuses connected to the virtual ring network.

The distributed hash table may contain user identification information (hereinafter referred to as user ID information), ID information of the automatic work data migration apparatus that stores work data related to a predetermined work made by the user, and location address information of user work data.

The user ID information is used to discriminate between users that use devices connected to the virtual ring network. It is preferable that the user ID information is identical to information that is used by the user migration detector 203 to detect that the user leaves or accesses the work device connected to the virtual ring network.

It is preferable that the ID information of the automatic work data migration apparatus is a device ID number that the virtual ring network connection processor 201 assigns to the automatic work data migration apparatus to establish the virtual ring network.

The user migration detector 203 detects that that the user leaves or accesses the automatic work data migration apparatus. From the standpoint of the automatic work data migration apparatus connected to the corresponding work device, the case where the user leaves or accesses the work device is identical or similar to the case where the user leaves or accesses the automatic work data migration apparatus. Therefore, unless specifically mentioned, the case where the user leaves or accesses the work device is regarded as being identical or similar to the case where the user leaves or accesses the automatic work data migration apparatus.

Preferably, in order to discriminate between different users, the user migration detector 203 uses the user ID information to determine whether the user leaves or accesses the work device. In a preferred embodiment of the present invention, users of the devices are assigned different RFID tags and the devices are equipped with an RFID reader, so that the user migration detector 203 can determine whether the user leaves or accesses the device.

If it is detected by the user migration detector 203 that the user leaves the automatic work data migration apparatus, the user work data collecting/storing unit 204 automatically collects the user work data and stores the collected user work data into the automatic work data migration apparatus. For security of the user work data, the user work data collecting/storing unit 204 may encode the user work data prior to the storage of the user work data.

The user work data storage location notifier 205 records, in another automatic work data migration apparatus, the storage location information of the user work data that is stored by the user work data collecting/storing unit 204. At this point, it is preferable that the storage location information of the user work data is recorded in the hash table of the automatic work data migration apparatus.

In order to synchronize management of the storage location information of the user work data between the automatic work data migration apparatuses connected to the virtual ring network, it is preferable that the another automatic work data migration apparatus is determined on the basis of the user ID and the hash function that is used by the distributed hash table manager 202.

If it is detected by the user migration detector 203 that the user accesses the automatic work data migration apparatus, the user work data searcher 206 searches the automatic work data migration apparatus, in which the location information is recorded, to detect the storage location information of the user work data in the previous work device. Preferably, the above search operation is performed using the user ID and the hash function used in the distributed hash table manager 202.

The user work data downloader 207 detects the location information searched by the user work data searcher 206, and transmits the user work data, which are stored at a location corresponding to the location information, through the virtual ring network to the automatic work data migration apparatus that is currently accessed by the user. The user work data downloader 207 is for downloading the collected user work data from the automatic work data migration apparatus connected to the work device or from the another automatic work data migration apparatus connected via the virtual ring network according to the location information detected by the user work data searcher.

The user work data recoverer 208 recovers the user work data downloaded by the user work data downloader 207 so that the user can use the user work data in a new work device. An embodiment for the above search operation is to execute an application used in the previous work device and then access the data. Another embodiment for the above search operation is to decode data that is encoded by the user work data collecting/storing unit 205. If the new work device is different in kind from the previous work device, the user work data of the previous work data is converted such that it can be used in the new work device.

Figure 3:
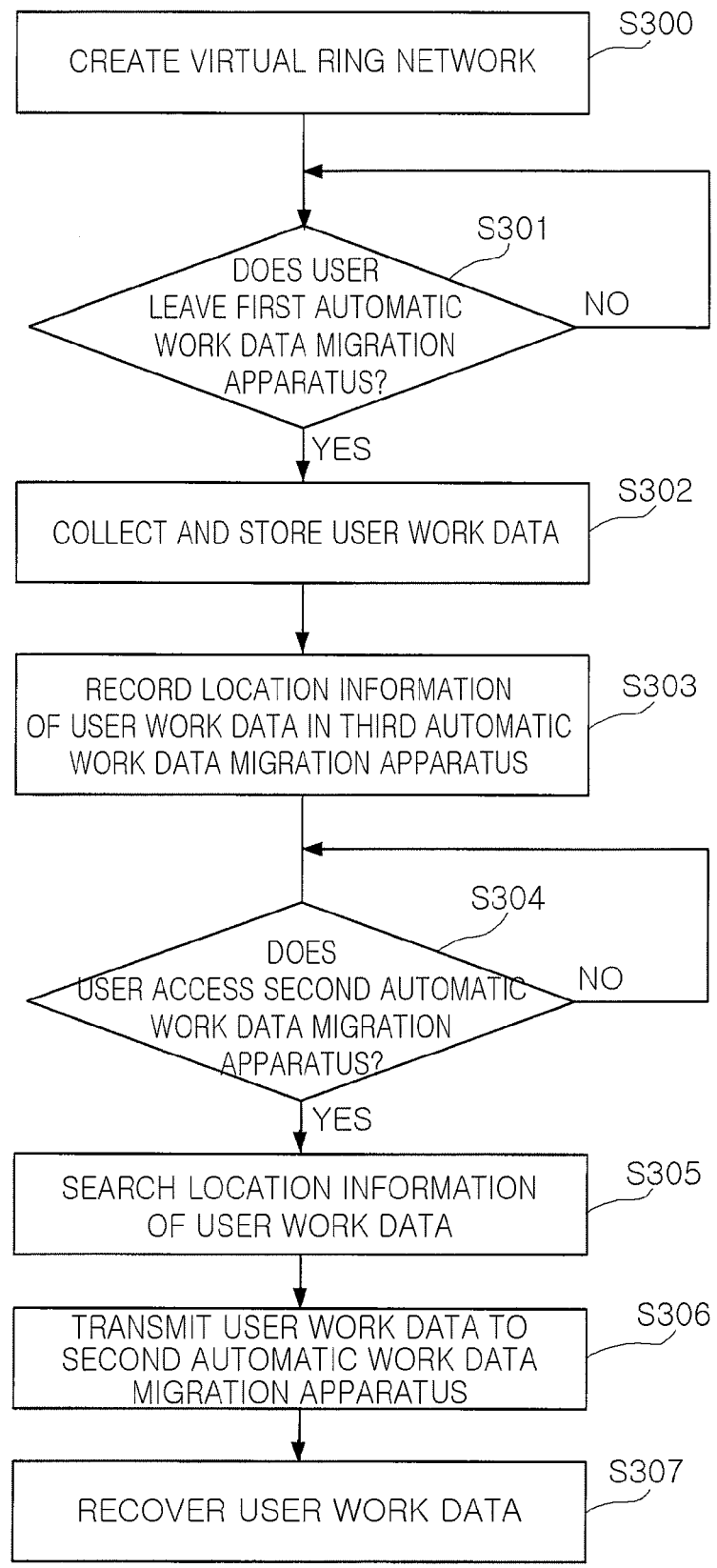
FIG. 3 is a flowchart illustrating an automatic work data migration method according to an embodiment of the present invention.

FIG. 3 is a flowchart illustrating an automatic work data migration method according to an embodiment of the present invention.

Referring to FIG. 3, prior to initiation of the automatic work data migration, the user connects the automatic work data migration apparatuses that are connected to the work devices, thereby creating the virtual ring network (in step S300). The step of creating the virtual ring network may include: assigning ID numbers to the automatic work data migration apparatuses; arranging the automatic work data migration apparatuses in order of the size of the assigned ID number (for example, in ascending or descending order of the assigned ID number); connecting the automatic work data migration apparatuses with ID numbers contiguous to each other; and connecting the automatic work data migration apparatus with the smallest ID number and the automatic work data migration apparatus with the largest ID number.

Among the automatic work data migration apparatuses connected through the virtual ring network, the automatic work data migration apparatus corresponding to (i.e., connected to) the work device, which is used prior to migration of the user, will be referred to as "first automatic work data migration apparatus". In step S301, it is determined whether the user leaves the first automatic work data migration apparatus, i.e., the work device. At this point, user ID information may be used as identification information for determining whether the user leaves the first automatic work data migration apparatus. In a preferred embodiment of the present invention, different users are assigned different RFID tags with different user ID numbers and an RFID reader is used to determine whether the user leaves the work device.

If it is determined that the user leaves the first automatic work data migration apparatus, the previous user work data are collected and stored in step S302. For example, the environment setting information of the work device previously accessed by the user, the environment setting information of an operating application, and the file and information related to a user work executed in the operating application are collected, and the collected information and file data are stored temporarily.

In step S302, the storage location information of the user work data in the first automatic work data migration apparatus is recorded in a third automatic work data migration apparatus that is selected to record the location information of the first automatic work data migration apparatus. In order to synchronize management of the storage location information of the user work data between the automatic work data migration apparatuses connected to the virtual ring network, it is preferable that the selection of the third automatic work data migration apparatus is performed by hashing the user ID using a hash function.

The step S302 may include: calculating the ID of the automatic work data migration apparatus corresponding to the third automatic work data migration apparatus using the user ID and the hash function; transmitting the user ID information, the ID information of the first automatic work data migration apparatus and the storage location information of the user work data in the first automatic work data migration apparatus to the third automatic work data migration apparatus; and recording the information in the distributed hash table of the third automatic work data migration apparatus.

In step S304, it is determined whether the user leaving the first automatic work data migration apparatus accesses a second automatic work data migration apparatus that is connected through the virtual ring network to the first automatic work data migration apparatus. In this document, when the user making a work using a first work device connected to the first automatic work data migration apparatus migrates to a second work device to continue to make the work, the automatic work data migration apparatus connected to the second work device will be referred to as "second automatic work data migration apparatus" so as to discriminate the second automatic work data migration apparatus from the first automatic work data migration apparatus.

If it is determined that the user accesses the second automatic work data migration apparatus, the location information of the user work data executed before the migration of the user is searched in step S305. The step S305 may include: hashing the user ID information to calculate the ID of the third automatic work data migration apparatus in which the location information of the user work data is recorded; and collecting the location information of the user work data recorded in the third automatic work data migration apparatus. Preferably, the distributed hash table of the third automatic work data migration apparatus is read to collect the location information of the user work data from an entry corresponding to the user ID.

At this point, if fails to obtain the location information of the user work data from the third automatic work data migration apparatus, the method may further include again transmitting a search request to the automatic work data migration apparatus adjacent to the third automatic work data migration apparatus to obtain the resulting value.

In step S306, the location information of the user work data, which was searched in step S305, is used to transmit the user work data from the first automatic work data migration apparatus to the second automatic work data migration apparatus and the user work data is recovered such that it can be used by the user.

Figure 4:
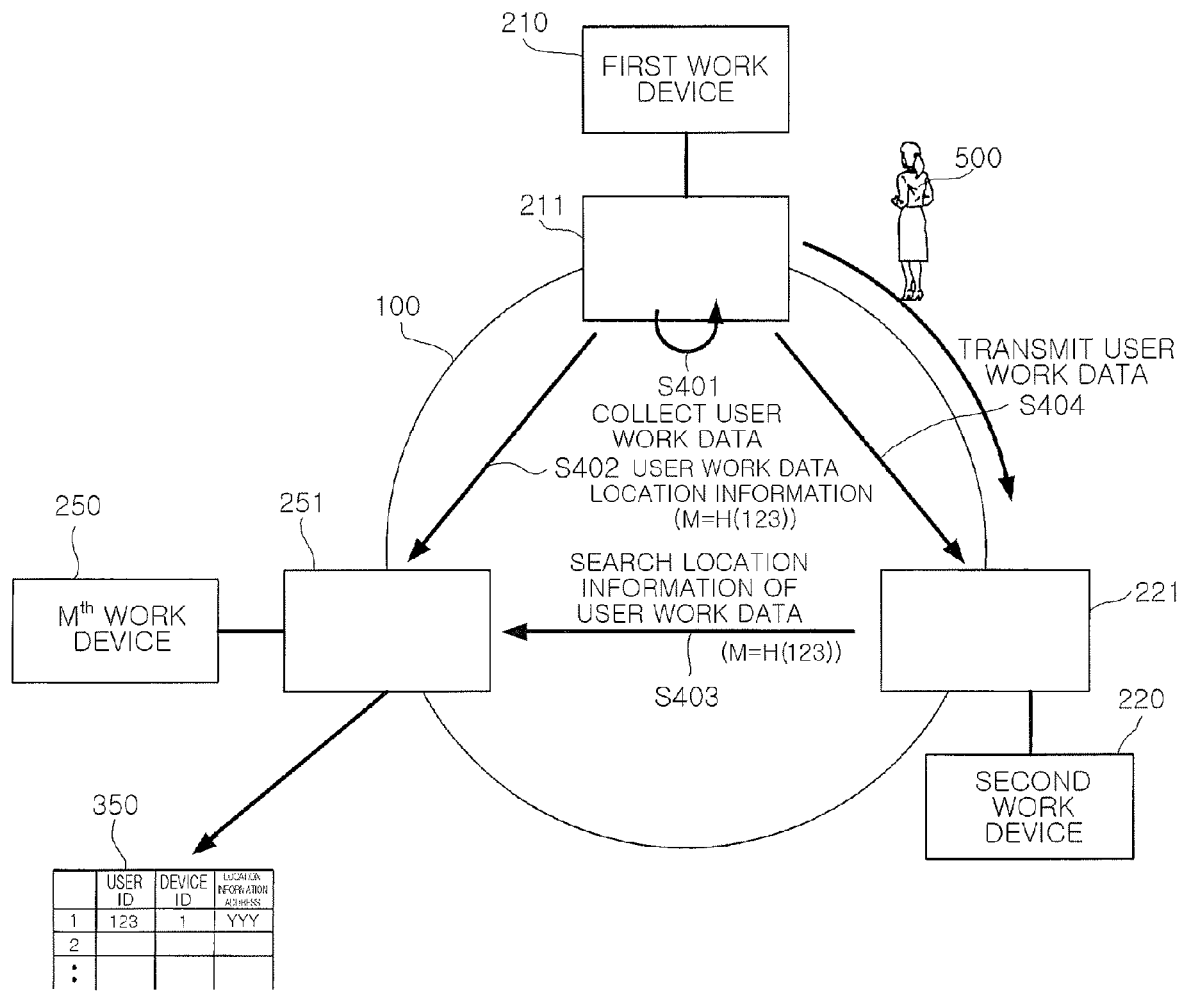
FIG. 4 is a schematic diagram illustrating an automatic work data migration method according to a preferred embodiment of the present invention.

FIG. 4 is a schematic diagram illustrating an automatic work data migration method according to a preferred embodiment of the present invention. Although FIG. 4 illustrates that the automatic work data migration apparatuses are installed outside the corresponding work devices, the present invention is not limited to this.

Referring to FIG. 4, a user 500 has an RFID tag with a tag number "123" as a user ID. The user 500 makes a work using a first work device 210 that has a device ID number "1" and includes a first automatic work data migration apparatus 211, and then migrates to a second work device 220 that has a device ID number "2" and includes a second automatic work data migration apparatus 221.

If detects that the user 500 leaves the first work device 210, the first automatic work data migration apparatus 211 of the first work device 210 collects user work data that are related to a task made by the user 500 in the first work device 210 (in step S401).

In step S402, the first automatic work data migration apparatus 211 of the first work device 210 uses a hash function H to hash the RFID tag number "123" of the user 500 and obtain the location information M (M: natural number) of the user work data (M=H(123)), notifies the RFID tag number "123" of the user 500, the device ID "1" of the first work device 210 and the storage location information address "YYY" of the user work data in the first automatic work data migration apparatus 211 to the $M^{th}$ automatic work data migration apparatus 251 of the $M^{th}$ work device with a device ID number "M", and records the information in a distributed hash table 350 of the $M^{th}$ automatic work data migration apparatus 251.

In step S403, if detects that the user 500 accesses the second work device 200, the second automatic work data migration apparatus 221 of the second work device 220 reads the RFID tag number "123" of the user 500, uses the hash function in step S402 to calculate the $M^{th}$ work device 251 in which the user work data are recorded (M=H(123)), and obtains the location information of the user work data from the distributed hash table 350 of the $M^{th}$ automatic work data migration apparatus 251.

In step S404, using the location information obtained from the $M^{th}$ automatic work data migration apparatus 251, the first automatic work data migration apparatus 211 of the first work device 210 transmits the user work data stored at a location "YYY" in the first automatic work data migration apparatus 211 to the second automatic work data migration apparatus 221 of the second work device 220 accessed by the user 500. At this point, if necessary, the transmitted user word data may be recovered into the format for use in the second work device 220.

As set forth above, the exemplary embodiments of the present invention provide an apparatus and method that can automatically migrate data (e.g., setting information) related to the previous work device to the next work device even when the user migrates between a plurality of work devices during the execution of a continuous work.

While the present invention has been shown and described in connection with the preferred embodiments, it will be apparent to those skilled in the art that modifications and variations can be made without departing from the spirit and scope of the invention as defined by the appended claims.

What is claimed is:

1. A method for automatically migrating user work data in a virtual ring, network, wherein the virtual ring network comprises two or more work data migration apparatuses, wherein each work data migration apparatus is connected to a corresponding work device, the method comprising:
   detecting, at a first automatic work data migration apparatus, that a user either is near or has left the vicinity of a first work device corresponding to the first automatic work data migration apparatus;
   in response to detecting that the user has left the vicinity of the first work device, the first automatic work data migration apparatus performing the steps of:
      collecting the user work data from the first work device and storing the collected user work data in the first automatic work data migration apparatus; and
      providing storage location information of the user work data to one or more other automatic work data migration apparatuses via the virtual ring network; and
   in response to detecting that the user is near the first work device, the first automatic work data migration apparatus performing the steps of:
      retrieving storage location information of the user work data, where the storage location information states that the storage location of the user work data is another automatic work data migration apparatus;
      downloading the user work data from the another work data migration apparatus via the virtual ring network and providing the downloaded user work data to the first work device.

2. The method according to claim 1, further comprising:
   connecting the first automatic work data migration apparatuses to the first work before creating the virtual ring network.

3. The method according to claim 1, wherein creating the virtual ring network comprises:
   assigning separate device ID numbers to the automatic work data migration apparatuses;
   arranging the automatic work data migration apparatuses in accordance to an ascending or a descending size order corresponding to the assigned device ID numbers; and
   connecting the automatic work data migration apparatuses with each other and connecting the automatic work data migration apparatus assigned with the smallest device ID number to the automatic work data migration apparatus assigned with the largest device ID number.

4. The method according to claim 1, wherein different users are assigned different RFID tags.

5. The method according to claim 1, wherein the user work data stored is at least one selected from information of the first work device information of an application used by the user, and work file information related to the application.

6. The method according to claim 1, wherein the storage location information of the user work data is stored in a distributed hash table.

7. The method according to claim 1, wherein the providing step comprises:

calculating an ID of the first automatic work data migration apparatus where user work data is stored by using an RFID tag of the user and a hash function; and recording, in a distributed hash table the ID of the first automatic work data migration apparatus, ID information of the user, and storage location information of the user work data in the first automatic work data migration apparatus.

8. The method according to claim 7, wherein the step of retrieving step comprises:

hashing the user ID information to calculate a device ID of the another automatic work data migration apparatus where the location information of the user work data is recorded; and collecting the location information of the user work data.

9. The method according to claim 8, wherein the step of collecting the location information of the user work data comprises reading hash tables of the another automatic work data migration apparatus.

10. The method according to claim 1, further comprising, after the downloading step, reformatting the user work data into a usable format suitable for the first work station.

11. An automatic work data migration apparatus connected between a work device and a virtual ring network, the apparatus comprising:

a radio-frequency identification (RFID) is configured to detect the presence of an RFID Tag of a user;

a user migration detector that detects that the user either is near or has left the vicinity of the work device based on the RFID reader;

a user work data collecting/storing unit that collects the user's work data from the work device and stores the collected work data when the user migration detector detects that the user has left the vicinity of the work device;

a user work data storage location notifier that records, in another automatic work data migration apparatus via the virtual ring network, the storage location information of the collected work data when the user migration detector detects that the user has left the vicinity of the work device;

a user work data searcher that searches for storage location information of the user's work data when the user migration detector detects that the user is near at the work device; and a user work data downloader that downloads the user's work data when the user's work data is stored on another automatic work data migration apparatus when the user migration detector detects that the user is near at the work device.

12. The apparatus according to claim 11, further comprising a distributed hash table manager is configured to a distributed hash table for use of a distributed hash function so that the user work data storage location notifier and the user work data searcher is able to synchronize the distributed management of the user work data and the data search.

13. The apparatus according to claim 12, wherein the distributed hash table contains user identification information, the ID information of the automatic work data migration apparatus that stores work data related to a predetermined work made by the user, and location address information of the user work data.

14. The apparatus according to claim 11, further comprising a virtual ring network connection processor that connects the automatic work data migration apparatuses to the virtual ring network and maintains the connection.

15. The apparatus according to claim 14, wherein the virtual ring network connection processor assigns a separate ID number to each of the automatic work data migration apparatuses connected to the work devices accessed by the user, arranges the automatic work data migration apparatuses in order of the assigned ID number, connects the automatic work data migration apparatuses with the ID numbers contiguous to each other, and connects the automatic work data migration apparatuses with the start and end ID numbers.

16. The apparatus according to claim 11, further comprising a user work data recoverer is configured to recover the user work data downloaded by the user work data downloader so that the user can use the user work data in a new work device.

17. The apparatus according to claim 11, wherein the user migration detector is configured to detect whether or not individual users with different RFID tags are using the work device.

18. The apparatus according to claim 11, wherein the user work data storage location notifier hashes the user ID by a hash function to determine another automatic work data migration apparatus in which the storage location information of the user work data is to be retrieved.

* * * * *